July 27, 1943.    C. S. McCHESNEY ET AL    2,325,414
CONDUCTIVE RUBBER FLOORING
Filed May 31, 1941
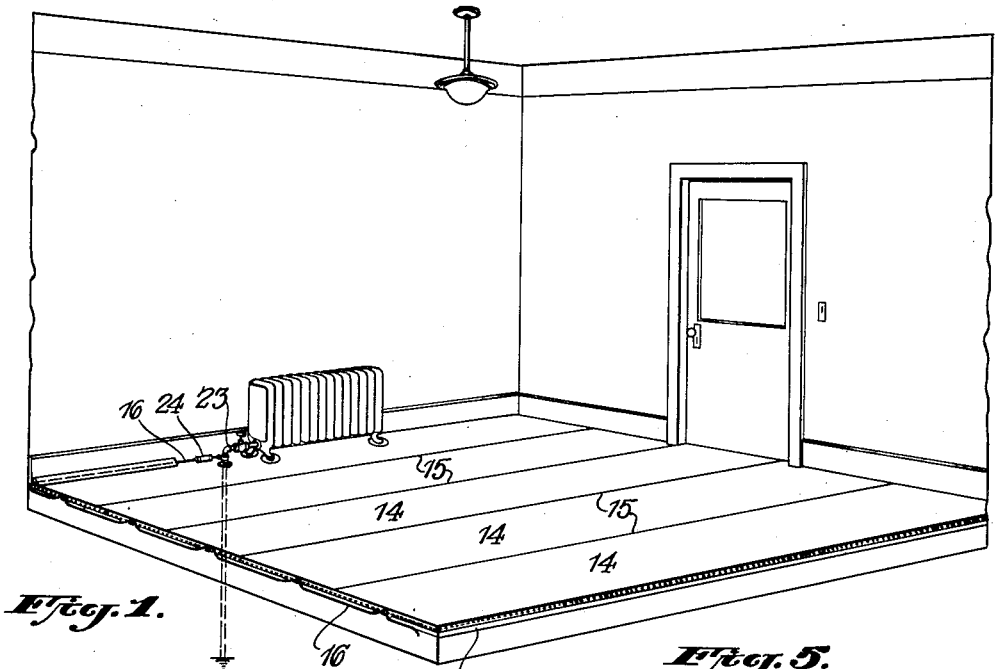
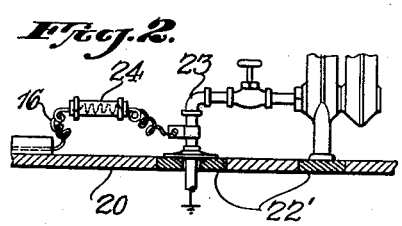
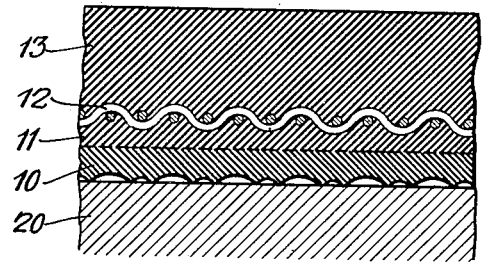
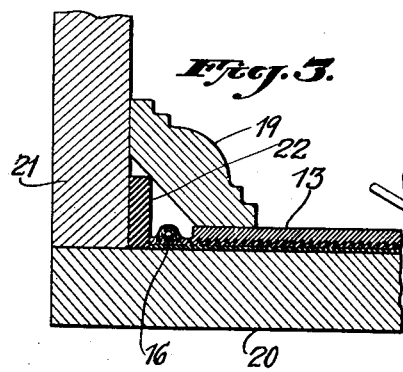
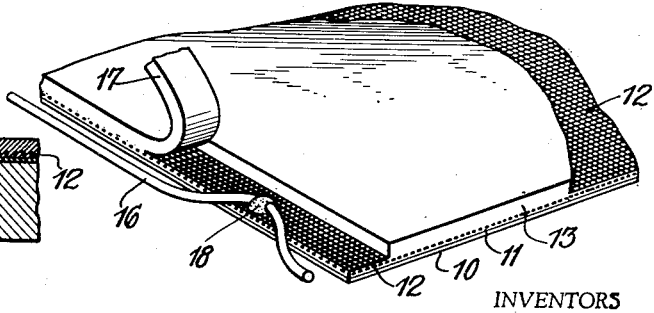
INVENTORS
CUYLER S. McCHESNEY.
BY  JOHN WINCHELL SHORT.
Benj. T. Rauber  ATTORNEY Patented July 27, 1943

2,325,414

UNITED STATES PATENT OFFICE 2,325,414

CONDUCTIVE RUBBER FLOORING

Cuyler S. McChesney, Kenmore, and John Winchell Short, Buffalo, N. Y., assignors to Dunlop Tire and Rubber Corporation, Buffalo, N. Y., a corporation of New York Application May 31, 1941, Serial No. 396,232

6 Claims. (Cl. 175—264)

Our invention relates to conductive rubber flooring and to a combination of means whereby said flooring may be effectively grounded with a substantially uniform resistance from all parts of said flooring.

Rubber compositions generally are so highly resistant to the passage of electric currents that they are considered as insulators and frequently used for that purpose. Such compositions when used as flooring have the disadvantage that they do not prevent the accumulation of static charges of electricity, such as may be created by frictional effects.

The accumulation of such static electric charges of high potential or voltage are annoying because they create sparks when brought into contact with conductors or when grounded, and these sparks may cause dangerous explosions if the atmosphere through which they pass is mixed with combustible vapors.

The electric resistance of rubber compositions may be lowered, and their conductivity increased, by the incorporation into the compositions of suitable conductive materials. Such materials are well known.

Rubber compositions of this type have sufficient electric conductivity to permit of high potential or static electricity to dissipate or flow, although the conductivity even of such rubber compositions may be below that of the usual metallic conductors.

A flooring constructed of such material would effectively and quickly conduct any electricity or electric charges formed frictionally or otherwise for a short distance without a considerable voltage drop, but would offer an objectionable voltage drop for the conduction of considerable quantities of electricity over long distances and might, therefore, not give an even distribution of electric charges.

In our present invention we provide a flooring with a highly conductive material, such as metallic wire, distributed throughout the area of the flooring. This highly conductive system of wire or wire mesh is connected to a ground so that a charge of electricity, static or otherwise, need pass only a short distance through the conductive rubber to the highly conductive wire and thence to ground.

A resistance or resistor may be inserted in the connection from the wire to the ground, and if the conductivity of the rubber be made relatively large as compared to this resistance, the conductivity from any part of the flooring to ground will thus be made substantially equal.

A highly conductive rubber flooring would, however, permit conduction of electricity from a distributing system, such as a wiring circuit, to the supporting floor or the material beneath the floor with which it comes into contact, such as pipes, conduit, beams, moist concrete, etc., and might facilitate the passage of objectionable stray currents to such structures.

In our present invention we overcome this by forming the flooring in a number of layers, the lowermost of which is of non-conducting rubber on which is superposed layers of conducting rubber and the conductive wire mesh or system which is thus enclosed entirely in the conductive rubber.

By this method a controlled resistance is provided from every part of the surface of the flooring to ground while at the same time the passage of current from or through the conductive flooring to underlying or supporting structures is effectively prevented. By controlling the resistance to ground, electric shock to a person on the floor by contact with a low voltage line, such as 110 volt lighting circuit, is prevented or minimized.

The various features of our invention are illustrated, by way of example, in the accompanying drawing in which Fig. 1 is a perspective view of a room provided with a flooring and a grounding system embodying a preferred form of our invention. Fig. 2 is a detail view on a larger scale of the resistor connections in the grounding system. Figs. 3 and 4 are respectively a vertical section and a perspective on a greatly enlarged scale of the flooring and wiring connections, and Fig. 5 is a vertical section on a still larger scale of the flooring.

Referring more particularly to Fig. 5 of the accompanying drawing, the flooring is illustrated as made of a lowermost layer 10 of non-conductive rubber material, a superposed layer 11 of a conductive material, a metallic mesh 12 and an upper or top layer 13 of conductive rubber material. These several layers may be of any desired type and the specific composition to be employed is not a part of the present invention inasmuch as a large number of compositions are known in the art and their selection is a matter of preference or judgment. Examples of such compositions are believed to be unnecessary.

The lowermost layer 10 may be of any of the usual non-conductive rubber compositions, while the layers 11 and 13 are of conductive rubber compositions and preferably of highly conductive compositions, that is, highly conductive within the limits of conductive rubber.

The metal 12 may be of any suitable metal or alloy, such as copper, protected with a plating or coating, if desired, or of brass, iron, etc. All of these metals have a much higher conductivity than that of even a highly conductive rubber composition. By embedding this wire mesh or screen between two highly conductive rubber layers 11 and 13, an effective contact between the conductive rubber composition and the mesh 12 and grounding system is ensured.

The lowermost or non-conductive layer 10 is preferably given a different color from that of the conductive layers to mark it as an insulating layer so that the characteristics of the conductive and non-conductive layers will be readily apparent. For example, the conductive layers may be black and the lowermost layer 10 may be given a brown or lighter color.

Conductive rubber flooring is generally made in strips which are laid on the floor with their longitudinal edges in contact and cemented together to form a watertight joint. For example in Fig. 1 the strips of flooring are indicated at 14 and the joints at 15.

With this arrangement of the rubber flooring an electric circuit or connection from the wire mesh 12 to a ground, such as a grounded water pipe, is conveniently and effectively made by connecting a wire 16, Figs. 1, 3 and 4 to the wire mesh 12 at the ends of the strips 14.

As shown in Figs. 3 and 4 this may be done by cutting a narrow strip 17 from the layer 13 at the ends of the strips 14 to expose the wire mesh 12 and soldering the wire 16 to the mesh 12 at intervals 18 so as to make a continuous autogenous connection from the wire mesh to the wire. After soldering the strips 17 may be replaced, if desired, or may be covered by a baseboard or molding 19. To prevent the passage of current from the conductive layers 11, 12, 13 to the supporting floor 20, or wall 21, the non-conductive layer 10 may be extended and turned up to cover or end the conductive layer, or a non-conductive strip 22, Fig. 3, may be provided to prevent contact from the conductive layers directly to the floor or wall.

Similarly all direct contact between the conductive layer and the grounding system as, for example, the feet of the radiator and the radiator pipes, should be insulated as indicated at 22' in Fig. 2.

The conductive wire or lead 16 is conducted or brought to a convenient point for connecting to a pipe or other grounded system 23, Figs. 1 and 2. Between the wire 16 and the grounded pipe 23 there is inserted a resistor 24 to control the resistance from the floor to the ground.

The resistance of the resistor 24 may be made high relative to that of the conductive rubber layers 11 and 13 and the connector system, or conversely, the conductivity of the layers 11 and 13 may be made high relative to the resistor 24 so that the resistance from the surface of the flooring to the mesh 12 may be made very small or negligible relative to the resistance in the resistor 24. With this arrangement a substantially uniform or constant resistance from every part of the flooring to ground is provided and uneven distribution of electric potential is avoided. The resistance in the resistor may, of course, be made sufficiently high to avoid a low resistance circuit from any person on the floor who may accidentally come in contact with a low voltage circuit as, for example, 110 volt circuit.

Through the above invention we have provided a flooring having a uniform, controlled, conductivity to ground but in which the surface of the flooring is effectively insulated from supporting structures and in which, therefore, the ready leakage to ground from power or supply circuits through structural elements of a building is avoided.

What we claim is:

1. Floor covering which comprises a lower layer of insulating rubber, an upper layer of conductive rubber and a metallic conductor extending throughout the area of, and wholly embedded in, said upper conductive layer.

2. Floor covering which comprises a lower layer of insulating rubber, an upper layer of conductive rubber, a metallic conductor extending throughout the area of, and wholly embedded in, said upper conductive layer and a grounded conductor electrically connected to said embedded metallic conductor.

3. Floor covering which comprises a lower layer of insulating rubber, an upper layer of conductive rubber, a metallic conductor extending throughout the area of, and wholly embedded in, said upper conductive layer, a grounded conductor electrically connected to said embedded metallic conductor and a resistance in said grounded conductor greater than the resistance from the exposed surface of said conductive layer to said embedded metallic conductor.

4. Floor covering which comprises a lower layer of insulating rubber, an upper layer of conductive rubber, a metallic conductor extending throughout the area of, and wholly embedded in, said upper conductive layer and means to insulate the exposed edge of said conductive layer.

5. Floor covering which comprises a layer of conductive rubber, a metallic conductor distributed throughout the area of, and wholly embedded in, said layer of conductive rubber and a grounded conductor electrically connected to said embedded metallic conductor and having a greater resistance than that from the surface of said conductive rubber to the metallic conductor embedded therein and means for insulating the lower and edge portions of said layer of conductive rubber.

6. Floor covering which comprises a layer of conductive rubber and a reticulated metallic conductor below the surface of said conductive layer and embedded therein to form an extensive electric contact therewith and means for grounding said reticulated conductor, said grounding means having a greater resistance than that from the surface of said covering to said reticulated conductor and the lower and edge portions of said layer of conductive rubber being insulated.

CUYLER S. McCHESNEY.
JOHN WINCHELL SHORT.